(12) United States Patent
Chang et al.

(10) Patent No.: US 6,947,106 B2
(45) Date of Patent: Sep. 20, 2005

(54) LIQUID CRYSTAL DISPLAY PANEL HAVING LIGHT IMPERMEABLE LAYER WITH ALIGNMENT MARKS

(75) Inventors: Youn Gyoung Chang, Kyonggi-do (KR); Seung Ryul Park, Inchon-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 15 days.

(21) Appl. No.: 10/134,602

(22) Filed: Apr. 30, 2002

(65) Prior Publication Data

US 2003/0067569 A1 Apr. 10, 2003

(30) Foreign Application Priority Data

Oct. 4, 2001 (KR) ........................................ 2001-61257

(51) Int. Cl.⁷ ..................... G02F 1/1335; G02F 1/1333
(52) U.S. Cl. ....................................... 349/106; 349/110
(58) Field of Search ........................... 349/110–111, 106

(56) References Cited

U.S. PATENT DOCUMENTS 6,100,584 A * 8/2000 Noritake et al. ............ 257/730
6,143,450 A * 11/2000 Sobue et al. .................... 430/7
6,307,613 B1 * 10/2001 Iida ............................ 349/158

* cited by examiner

*Primary Examiner*—Dung T. Nguyen
(74) *Attorney, Agent, or Firm*—Heller Ehrman LLP (57) ABSTRACT

A liquid crystal display panel having a light impermeable layer with alignment marks is disclosed in the present invention. The panel includes a light impermeable layer on a substrate, a plurality of alignment marks around at least first and second corners of the substrate, the first and second corners being separated from each other in a diagonal direction, and a plurality of color filter layers on light impermeable layer.

21 Claims, 8 Drawing Sheets

LIQUID CRYSTAL DISPLAY PANEL HAVING LIGHT IMPERMEABLE LAYER WITH ALIGNMENT MARKS

This application claims the benefit of the Korean Application No. P2001-061257 filed on Oct. 4, 2001, which is hereby incorporated by reference.

BACKGROUND OF THE INVENTION

1. Field of the Invention

The present invention relates to a liquid crystal display device, and more particularly, to a liquid crystal display panel having a light impermeable layer with alignment marks. Although the present invention is suitable for a wide scope of applications, it is particularly suitable for preventing a misalignment of color filters.

2. Discussion of the Related Art

A flat panel display device has been widely used because it is thin and light in weight and requires low power consumption. The flat panel display device may be classified into two types by light emission. One is a light-emitting display device that emits light to display images and the other is a light-receiving display device that uses an external light source to display images. Plasma display panels (PDPs), field emission display (FED) devices, and electro luminescence (EL) display devices are examples of the light-emitting display devices, and a liquid crystal display device is an example of the light-receiving display device. The liquid crystal display device has been widely used for laptop computers and desktop monitors because of its superiority in resolution, color image display, and quality of displayed images.

Generally, the liquid crystal display (LCD) device has upper and lower substrates, which are spaced apart and facing into each other. Electrodes formed on the substrates are facing into each other. A liquid crystal is interposed between the upper substrate and the lower substrate. A voltage is applied to the liquid crystal through the electrodes of each substrate, and thus an alignment of the liquid crystal molecules is changed in accordance with the applied voltage to display images. Because the liquid crystal display device does not emit light as described above, it needs a light source to display images. Accordingly, the liquid crystal display device has a backlight behind a liquid crystal panel as a light source. An amount of incident light from the backlight is controlled in accordance with the alignment of the liquid crystal molecules to display images.

Figure 1:
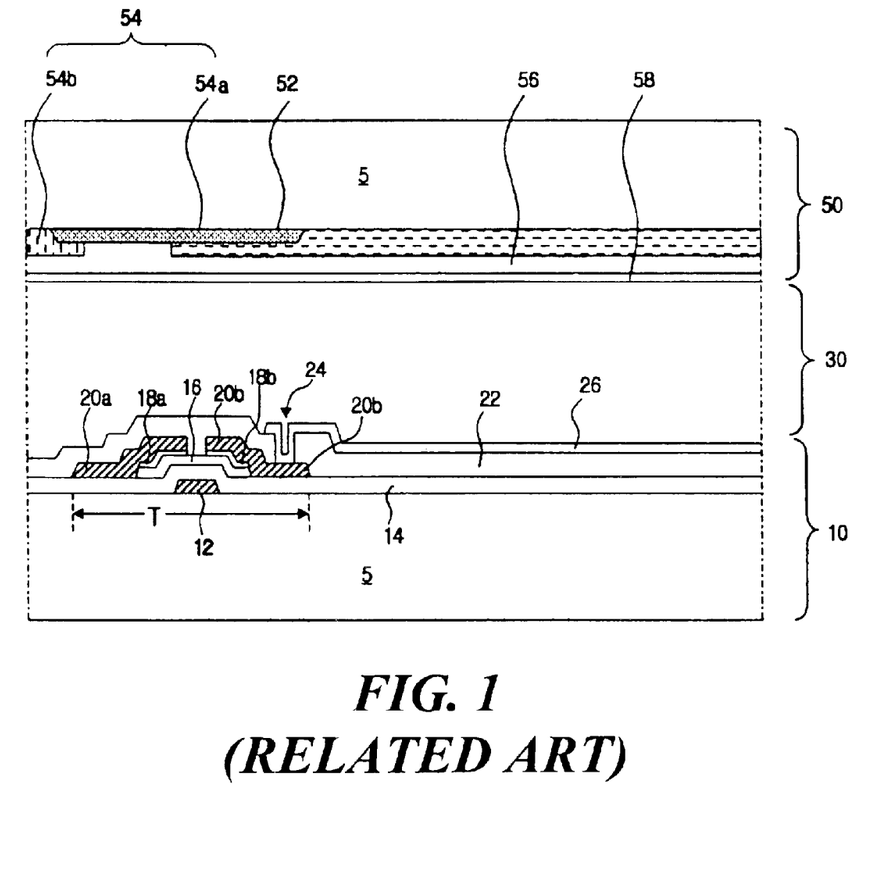
FIG. 1 is a schematic cross-sectional view illustrating a pixel of a conventional LCD panel having a thin film transistor as a switching device.

FIG. 1 is a schematic cross-sectional view illustrating a pixel of a conventional LCD panel having a thin film transistor as a switching device. As shown, the LCD panel has lower and upper substrates 10 and 50 and a liquid crystal (LC) layer 30 interposed therebetween. The lower substrate 10 has a thin film transistor (TFT) "T" as a switching element that switches a voltage for changing an orientation of the LC molecules. The thin film transistor "T" includes a gate electrode 12 on a transparent substrate 5, an active layer 16, first and second ohmic contact layers 18a and 18b, and source and drain electrodes 20a and 20b. A gate insulation layer 14 formed on the transparent substrate 5 is disposed between the gate electrode 12 and the active layer 16. The lower substrate 10 includes a passivation layer 22 to cover the TFT "T". The lower substrate 10 also includes a pixel electrode 26 on the passivation layer 22, which is used to apply electric fields across the LC layer 30 in response to signals applied to the TFT "T". The gate electrode 12 and the source electrode 20a are connected to a gate line and a data line, respectively, which perpendicularly cross each other and define a pixel region, i.e., a display area. The pixel electrode 26 is disposed in the pixel region and contacts the drain electrode 20b through a drain contact hole 24.

The upper substrate 50 includes a transparent substrate 5 and a plurality of color filters 54 on the surface of the transparent substrate 5 facing into the lower substrate 10 for representing colors. A black matrix 52 is disposed between the transparent substrate 5 and the color filters 54 and corresponds to the TFT "T". An overcoat layer 56 is formed on the color filters 54 such that the overcoat layer 56 protects the color filters 54 and makes the surface be planar. A common electrode 58 formed of a transparent conductive material is formed on the overcoat layer 56. The common electrode 58 serves as an electrode that produces electric fields across the LC layer with the pixel electrode 26.

Although FIG. 1 only shows one TFT "T", the lower substrate 10 usually includes a plurality of TFTs as well as a plurality of pixel electrodes contacting one another. The lower substrate 10 and the upper substrate 50 are respectively formed through different processes and then attached to each other. As mentioned before, the liquid crystal display device is a light-receiving display device, so that a backlight as a light source is necessary behind the liquid crystal panel. The light generated from the backlight passes through the upper and lower substrates and the liquid crystal layer. A light path is changed by an alignment of the liquid crystal molecules. Namely, the liquid crystal display device has a backlight as a light source behind the liquid crystal panel and an amount of the incident light from the backlight is controlled in accordance with the alignment of the liquid crystal molecules to display images.

Further, the black matrix 52 corresponds to the TFT "T", in FIG. 1. The black matrix 52 is disposed at the peripheries of the transparent substrate 5 of the upper substrate 50 and forms a rectangular shape having a display region therein. The display region is divided into a plurality of parallel stripes so that the color filters 54a, 54b, and 54c (shown in FIGS. 4 and 5) are positioned at each parallel stripe. The black matrix 52 on the upper substrate 50 usually has a rectangular shape to surround all the color filters and divide each color filter into a stripe shape.

In forming the upper substrate 50 (shown in FIG. 1), the black matrix 52 is formed on the transparent substrate 5, and then the color filters 54 representing red (R) 54a, green (G) 54b, and blue (B) 54c colors (shown in FIG. 4) are formed on the transparent substrate 5 to cover the black matrix 52. The color filters 54 are arranged in a repeated order of red (R) 54a, green (G) 54b, and blue (B) 54c, for example, and each red, green, and blue color filter corresponds to the pixel electrode 26 of the lower substrate 10. Thus, full color images is accomplished by the combination of the R, G, and B color filters 54a, 54b, and 54c. In other words, each R, G, and B color filter 54a, 54b, and 54c corresponds to each pixel electrode 26 located in the pixel region, and the light passing through these R, G, and B color filters displays various colors.

As mentioned before, the liquid crystal display device is a light-receiving display device, so that it requires a backlight device to display images. Namely, the liquid crystal display (LCD) panel transmits image data using the light emitted from the backlight device positioned behind the LCD panel. However, the light emitted from the backlight device is almost absorbed by the LCD panel while passing through the lower substrate 10, the liquid crystal layer 30 and the upper substrate 50. Therefore, only 3 to 8% of the incident light generated from the backlight device can be employed in the LCD device. As a result, the LCD device provides inefficient optical modulation.

Figure 2:
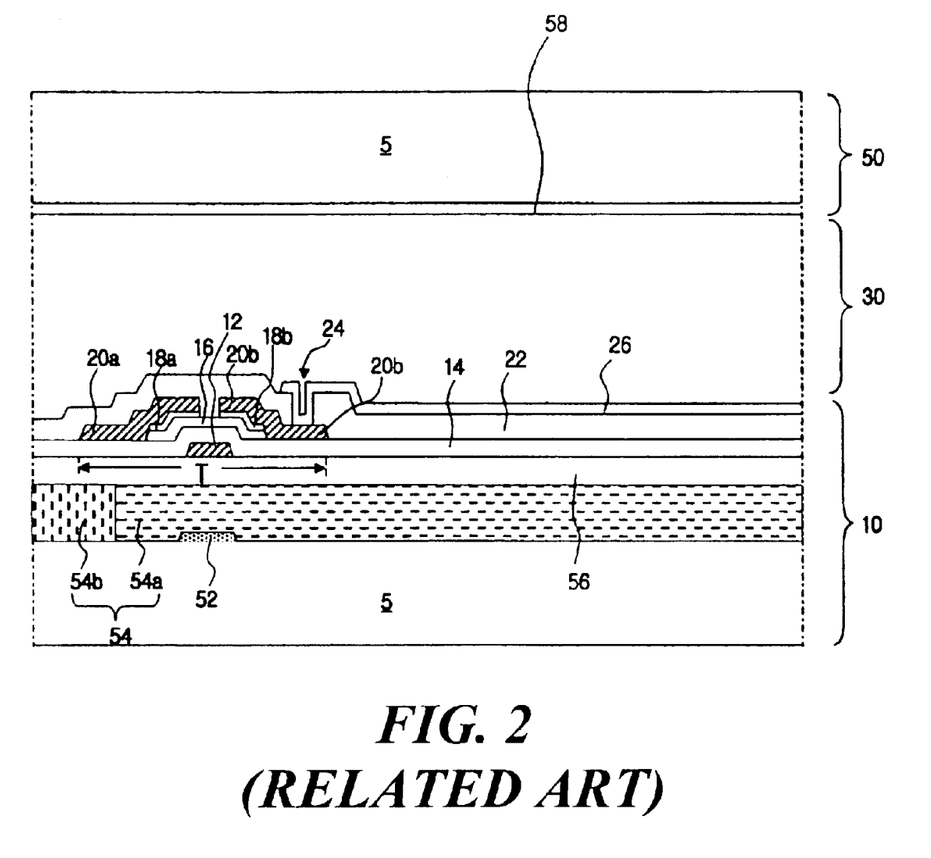
FIG. 2 is a schematic cross-sectional view illustrating a pixel of another conventional LCD panel having a thin film transistor as a switching device.
Figure 3:
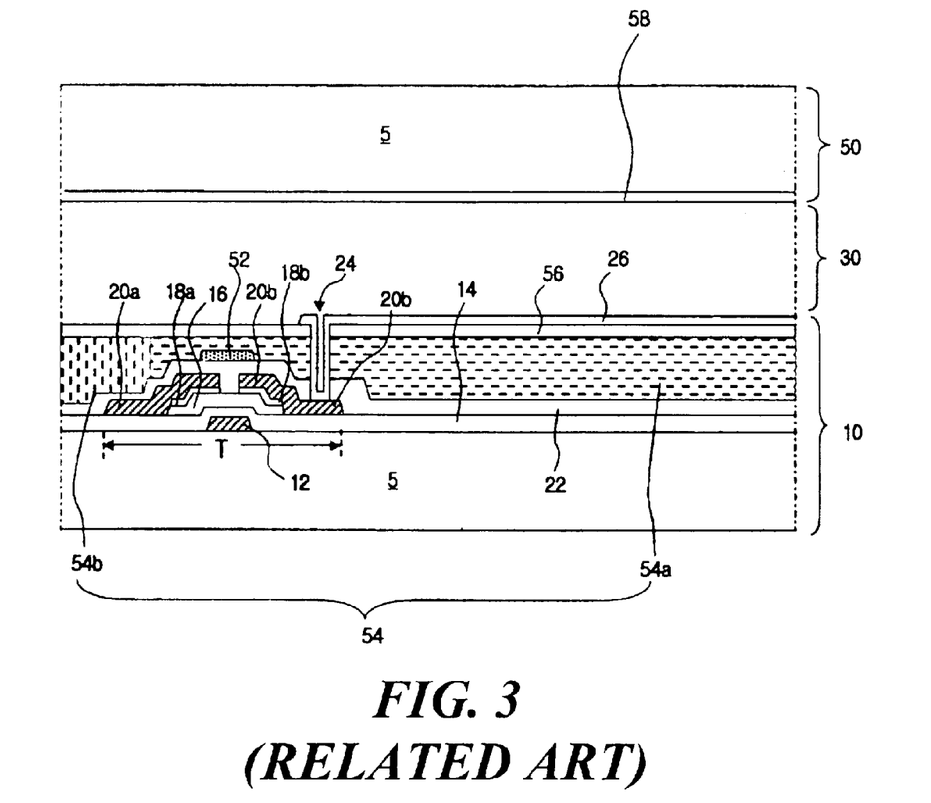
FIG. 3 is a schematic cross-sectional view illustrating a pixel of another conventional LCD panel having a thin film transistor as a switching device.

With the result of the poor light efficiency, various attempts have been made to improve the light efficiency of the liquid crystal display device. One of the efforts is to change a stripe shaped black matrix that divides the striped color filters into an island shaped black matrix, so that an aperture ratio of the LCD panel increases. Another is that the black matrix is reorganized and reconstructed in the LCD panel to obtain a high aperture ratio. The LCD panels each having a black matrix structure of a high aperture ratio are illustrated in FIGS. 2 and 3, as examples. Compared to that of FIG. 1, the LCD panels of FIGS. 2 and 3 have color filters and a black matrix particularly on the lower substrate.

In FIG. 2, an LCD panel having a high aperture ratio includes a lower substrate 10, an upper substrate 50, and a liquid crystal layer 30 interposed therebetween. On the lower substrate 10, a black matrix 52 that has an island shape is formed on a transparent substrate 5, and color filters 54 are also formed on the transparent substrate 5 and cover the black matrix 52. An overcoat layer 56 is disposed on the color filters 54 to protect and planarize the surface of the color filters 54. As contrary to the LCD panel of FIG. 1, the lower substrate 10 of FIG. 2 includes the black matrix 52 having an island shape, the color filters 54, and the overcoat layer 56. Further, a thin film transistor (TFT) "T" corresponding to the island shaped black matrix 52 is formed on the overcoat layer 56. Therefore, the black matrix and the color filters do not exist on the upper substrate 50. Also, a common electrode 58 is only disposed on a transparent substrate 5 of the upper substrate 50. However, an additional black matrix may be formed on the upper substrate 50 in this type.

In FIG. 3, a thin film transistor (TFT) "T" is formed on a transparent substrate 5 of the lower substrate 10. A passivation layer 22 covers the TFT "T" for protection. A black matrix 52 having an island shape is formed on the passivation layer 52 in the position corresponding to the TFT "T". The color filters 54 are formed on the passivation layer 22 and cover the black matrix 52. An overcoat layer 56 is formed on the color filters 54 to protect the color filters 54 and planarize the surface of the lower substrate. A pixel electrode 26 is formed on the overcoat layer 56 and contacts a drain electrode 20b of the TFT "T" through a drain contact hole 24.

In the LCD panels shown in FIGS. 2 and 3, the black matrix 52 has an island shape and corresponds to the TFT "T". Since both the black matrix 52 and the color filters 54 are formed on the lower substrate 10 and the black matrix 52 is very close to the TFT "T", it is possible to make the black matrix 52 in a very small size. Namely, the black matrix 52 of FIGS. 2 and 3 does not have to cover the whole area of the TFT.

Actually, it is sufficient for the black matrix 52 to cover the active channel of the active layer 16 between the source 20a and drain 20b electrodes. However, as shown in FIG. 1, the black matrix formed in the upper substrate has a relatively larger size to cover the whole TFT, although the TFT does not need to be covered entirely. Therefore, the black matrix of FIG. 1 degrades an aperture ratio of the LCD panel.

The black matrix of the LCD panels illustrated in FIGS. 2 and 3 having a high aperture ratio is formed to be close to the TFT on the lower substrate. Therefore, the black matrix can precisely cover the TFT, especially the channel region of the active layer. As a result, the black matrix does not need to cover the whole area of the TFT, as shown in FIG. 1. The size of the black matrix shown in FIGS. 2 and 3 will be sufficient to cover the channel region of the active layer between the source and drain electrodes.

Figure 4:
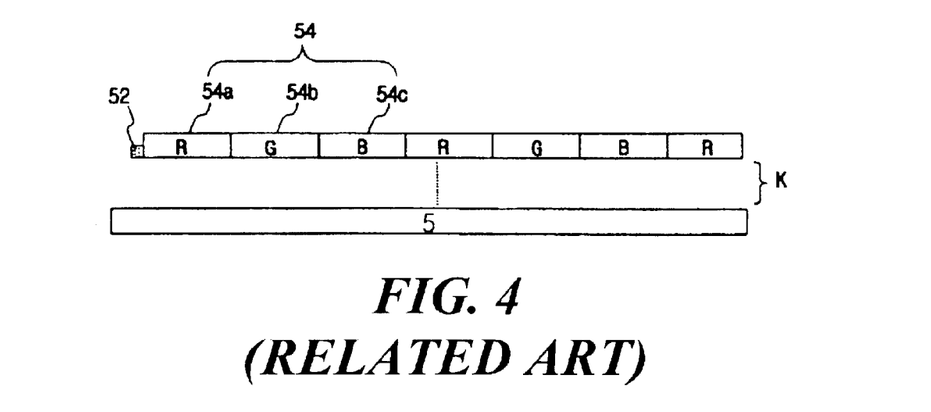
FIG. 4 is a partial schematic cross-sectional view illustrating color filters and black matrices of the conventional LCD panel.

FIG. 4 is a partial cross-sectional view that illustrates a structure and a composition of the color filters and the black matrix.

In FIG. 4, the LCD panel having a high aperture ratio is simplified by illustrating only the transparent substrate 5, the black matrix 52, and the color filters 54. The black matrix 52 and the color filters 54 can be directly formed on the transparent substrate 5, as shown in FIG. 2. Alternatively, the color filters 54 and the black matrix 52 can be formed on the TFT that will be disposed at a region "K" between the transparent substrate 5 and the color filters 54, as shown in FIG. 3.

Figure 5:
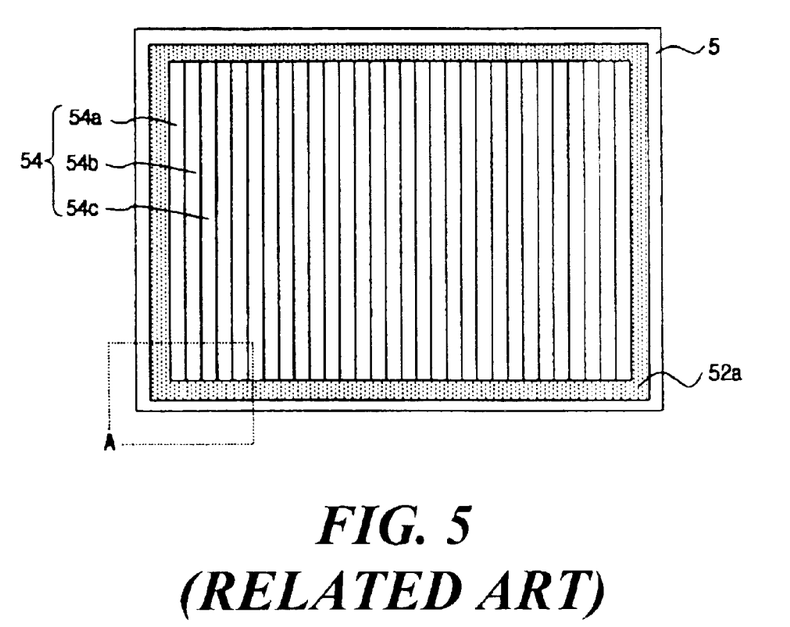
FIG. 5 is a plane view illustrating color filters and black matrices that are formed on a transparent substrate to increase an aperture ratio of the conventional LCD panel.

FIG. 5 is a plane view illustrating the color filters 54 and the black matrix 52 that are formed on a transparent substrate 5 to increase an aperture ratio. In FIG. 5, a rectangular black matrix 52a surrounds the color filters 54 having red (R) 54a, green (G) 54b, and blue (B) 54c colors. A plurality of island shaped black matrices 52b (shown in FIG. 6A) are formed within the stripe shaped color filters 54. An area where the rectangular black matrices 52a are disposed is a non-display area, such that it is finally covered by external cases when an LCD panel is installed to a laptop computer, for example. An area where the color filters are disposed is a display area. Therefore, the TFTs, the pixel electrodes, and the island shaped black matrices are disposed in the display area.

Figure 6A:
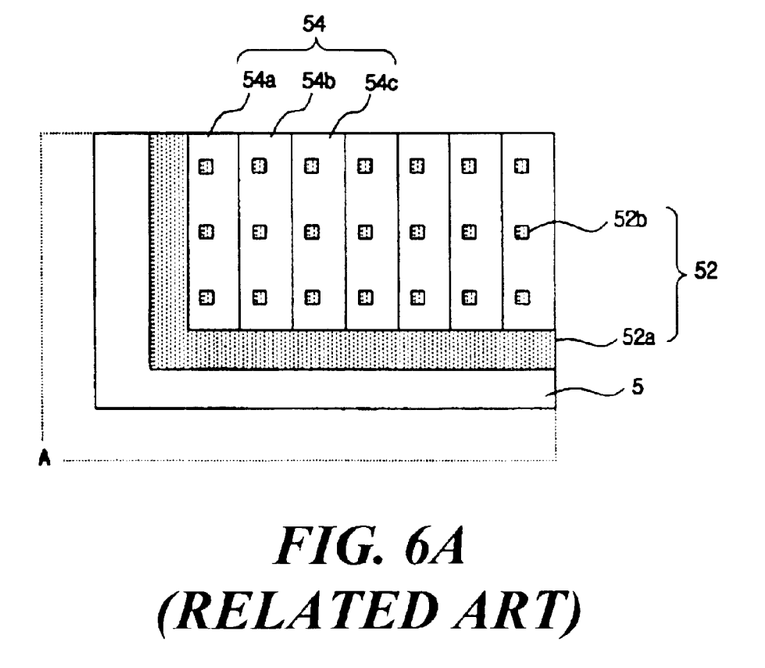
FIG. 6A is an enlarged plane view of a portion "A" of FIG. 5 illustrating the black matrices occupying a large area of the transparent substrate.

FIG. 6A is an enlarged plane view of a portion "A" of FIG. 5 and illustrates a plurality of black matrices. A plurality of island shaped black matrices 52b are formed on the lower substrate to increase an aperture ratio, as shown in FIGS. 2 and 3. Each island shaped black matrix 52b corresponds to each TFT to protect the active channel from the light. Alternatively, the island shaped black matrices 52b can be formed on the upper substrate of FIG. 1 as a modification of the stripe shaped black matrices to increase an aperture ratio.

Figure 6B:
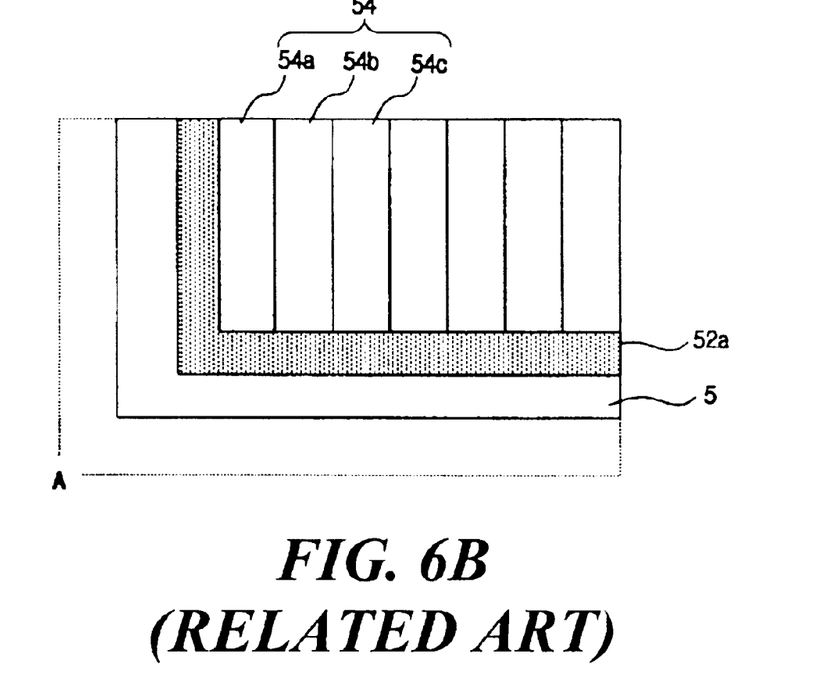
FIG. 6B is an enlarged plane view of the portion "A" of FIG. 5 illustrating the black matrices occupying a small area of the transparent substrate.

FIG. 6B is also an enlarged plane view of the portion "A" of FIG. 5 when an arrangement of the black matrices is changed. Although the island shaped black matrices are not shown in FIG. 6B, they are disposed at the stripe shaped color filters 54 and each corresponds to the TFT. The rectangular black matrix 52a is referred to as an external black matrix, and the island shaped black matrix 52b is referred to as an internal black matrix.

In forming the color filters 54 and the black matrices 52, the black matrices 52 are formed first, and then, the color filters 54 representing red 54a, green 54b, and blue 54c colors are formed on the internal black matrices. Thus, the color filters 54 cover the internal black matrices, as shown in FIGS. 2 and 3. As a result, a light efficiency is due to the small size of the black matrix.

However, there are some problems in aligning color filters to the corresponding internal black matrices and pixel electrodes. As widely known, it is important to exactly align each R, G, and B color filter to each internal black matrix and pixel electrode. If a misalignment of the color filters occurs, the LCD device cannot display clear images. Especially, since the LCD device has both the rectangular external black matrix and the plurality of the island shaped internal black matrices, it is much more difficult to align the color filters into the prearranged positions.

Moreover, since each color filter 54a, 54b, and 54c should cover all the island shaped internal black matrices 52b when forming the color filters 54, the internal black matrices 52b cannot act as alignment marks. Therefore, alignment marks for aligning the color filters are required. Additionally, when the black matrix 52 occupies a small area of the transparent substrate, aligning the color filters 54 becomes extremely difficult. Thus, a misalignment of R, G, and B color filters 54a, 54b, and 54c occurs frequently.

SUMMARY OF THE INVENTION

Accordingly, the present invention is directed to a liquid crystal display panel having a light impermeable layer with alignment marks that substantially obviates one or more of problems due to limitations and disadvantages of the related art.

Another object of the present invention is to provide a liquid crystal display panel having a light impermeable layer with alignment marks facilitating an alignment of red, green, and blue color filters into the desired position.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel includes a light impermeable layer on a substrate, a plurality of alignment marks around at least first and second corners of the substrate, the first and second corners being separated from each other in a diagonal direction, and a plurality of color filter layers on light impermeable layer.

According to the principles of the present invention, the alignment marks and the black matrices are formed of the same material and formed at same time. The black matrices include a rectangular shaped black matrix as well as a plurality of island shaped black matrices. The rectangular shaped black matrix encloses a display region having the color filters and, the plurality of island shaped black matrices. The alignment marks are disposed near a corner of the rectangular shaped black matrix, and thus, each alignment mark is disposed between the color filters at a corner of the rectangular shaped black matrix. The alignment marks may be located either inside or outside the rectangular shaped black matrix.

The alignment marks are parallel to or/and perpendicular to boundaries between the color filters.

The substrate above-mentioned further includes dummy patterns in the peripheries of the display region. In this case, each alignment marks is disposed between the dummy patterns at a corner of the rectangular shaped black matrix. Additionally, the alignment marks are parallel to and/or perpendicular to boundaries between the color filter and the dummy pattern.

In another aspect of the present invention, a liquid crystal display device includes first and second substrates facing into each other, a plurality of thin film transistors on the first substrate, a light impermeable layer on the second substrate, a plurality of island shaped black matrices on the second substrate, a plurality of alignment marks around at least first and second corners of the second substrate, wherein the first and second corners are separated from each other in a diagonal direction, and a plurality of color filter layers on the second substrate including the light impermeable layer and the island shaped black matrices.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

In the present invention, a plurality of alignment marks are formed with the black matrices to precisely arrange color filters into the desired positions without failure. The alignment marks may be utilized for a high aperture ratio.

Figure 7:
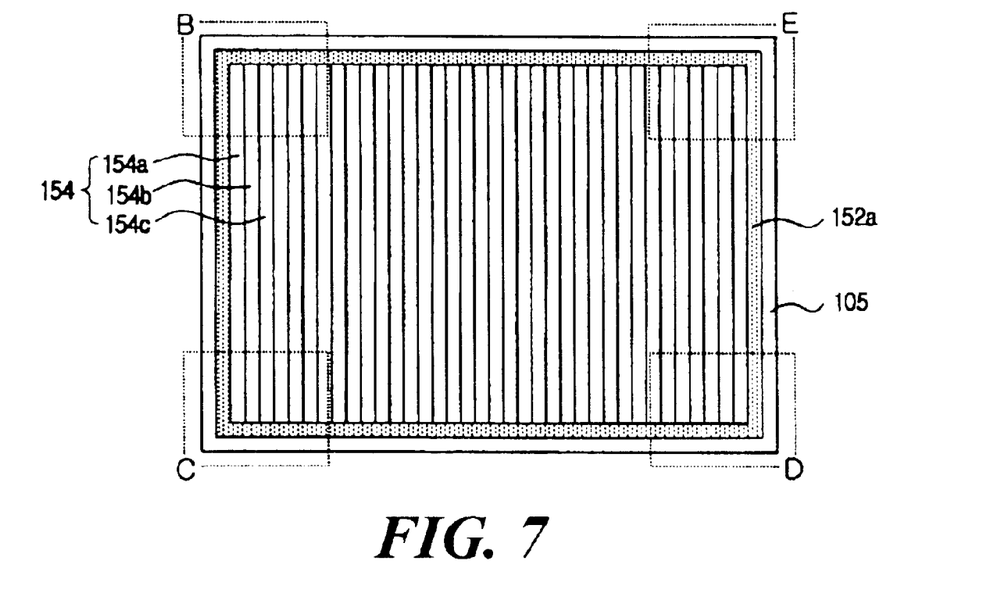
FIG. 7 is a plane view illustrating color filters and black matrices that are formed on the transparent substrate according to the present invention.

FIG. 7 is a plane view illustrating color filters and black matrices that are formed on the transparent substrate according to the present invention.

In FIG. 7, an external black matrix 152a (referred to as a light impermeable layer) having a rectangular shape is disposed at the peripheries of a transparent substrate 105. The light impermeable layer serves to increase more light to be absorbed by the color filter layers. A plurality of color filters 54 having red 154a, green 154b, and blue 154c are disposed inside the light impermeable layer 152a. An area where the color filters are located is a display area. In forming black matrices and color filters, the black matrices are formed on the substrate, and the color filters are then formed on the black matrices such that the black matrices are usually disposed between the transparent substrate and the color filters.

Figure 8A:
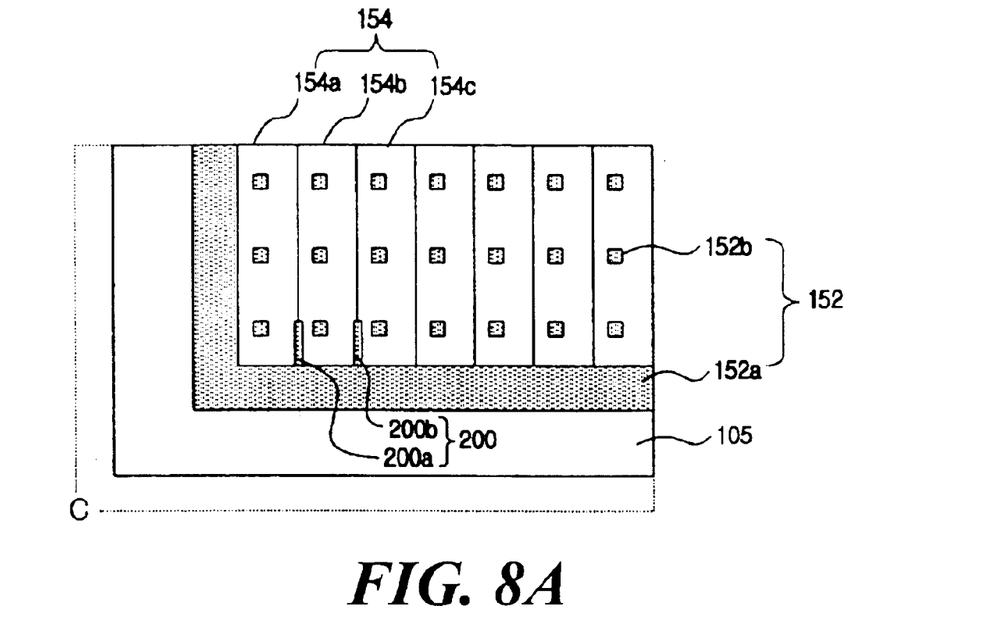
FIGS. 8A to 8C and 9A to 9C are enlarged plane views of a portion "C" of FIG. 7 illustrating black matrices and alignment marks according to the present invention.
Figure 8B:
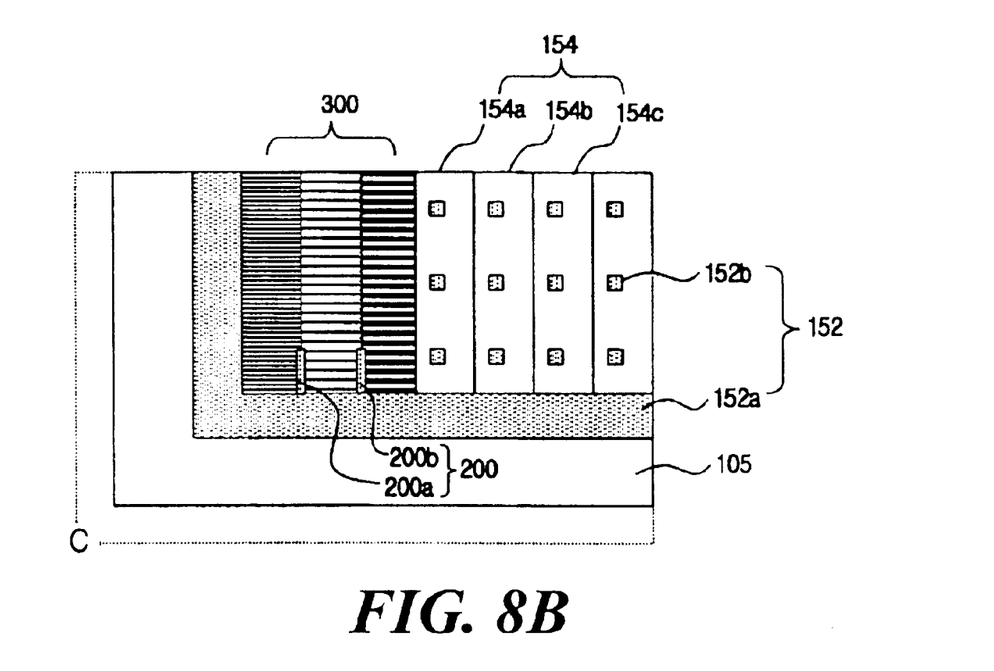
Figure 8C:
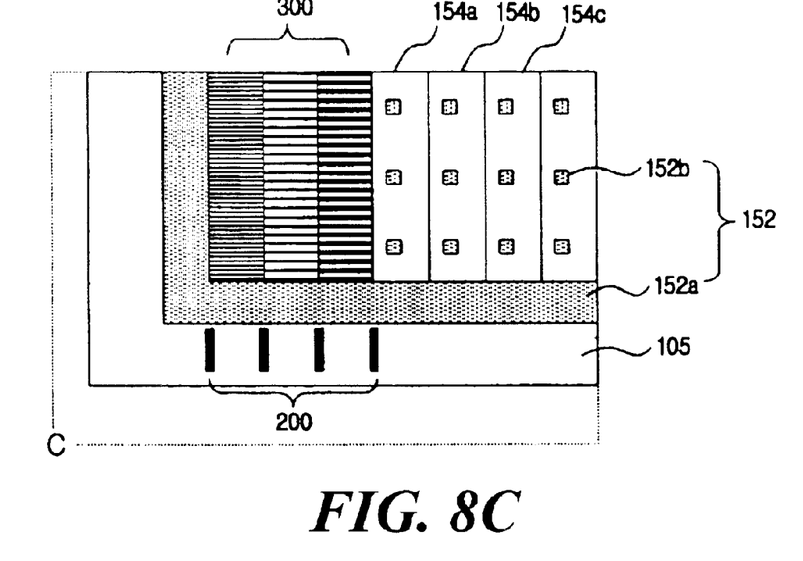

A plurality of alignment marks 200, shown in FIGS. 8A to 8C, and the black matrices are formed at the same time. The alignment mark may be located at corners "B", "C", "D", and "E" of FIG. 7. Since the alignment marks 200 are formed with the black matrices, the alignment marks 200 may be formed of the same material as the black matrices. Further, the alignment marks 200 may be located at least at one of the portions "B", "C", "D", and "E". Throughout the present invention, the alignment marks 200 are formed around at least two corners of the substrate in a diagonal direction.

FIGS. 8A to 8C are enlarged plane views of the portion "C" of FIG. 7 illustrating black matrices and alignment marks in accordance with the present invention. As shown in FIGS. 8A to 8C, the black matrices include a light impermeable layer 152a that surrounds the color filters 154 and a plurality of internal black matrices 152b that is located within a boundary of the light impermeable layer 152a.

In FIG. 8A, a first alignment mark 200a is disposed between the color filters 154a and 154b, and a second alignment mark 200b is disposed between the color filters 154b and 154c. As mentioned before, the alignment marks 200 and the black matrices 152 may be formed simultaneously. Thus, the alignment marks 200 may be the same material as the black matrices 152. In forming the alignment marks 200, a size of the alignment marks 200 is minimized, so that an aperture ratio of the LCD panel is not degraded. Although FIG. 8A shows that the alignment marks 200 are disposed inside the light impermeable layer 152a, the alignment mark 200 may be formed outside the light impermeable layer 152a.

An LCD panel may have dummy patterns 300 inside the light impermeable layer 152a, as shown in FIG. 8B. The dummy patterns 300 have a stripe shape like the color filters 154. In forming the dummy patterns 300, each alignment mark 200a or 200b may be formed between the dummy patterns 300.

In FIG. 8C, the alignment marks 200 are formed outside the light impermeable layer 152a in a location corresponding to the dummy patterns 300. Each alignment mark 200 corresponds to a boundary between the dummy patterns 300 or between the dummy pattern 300 and the color filter 154a.

Figure 9A:
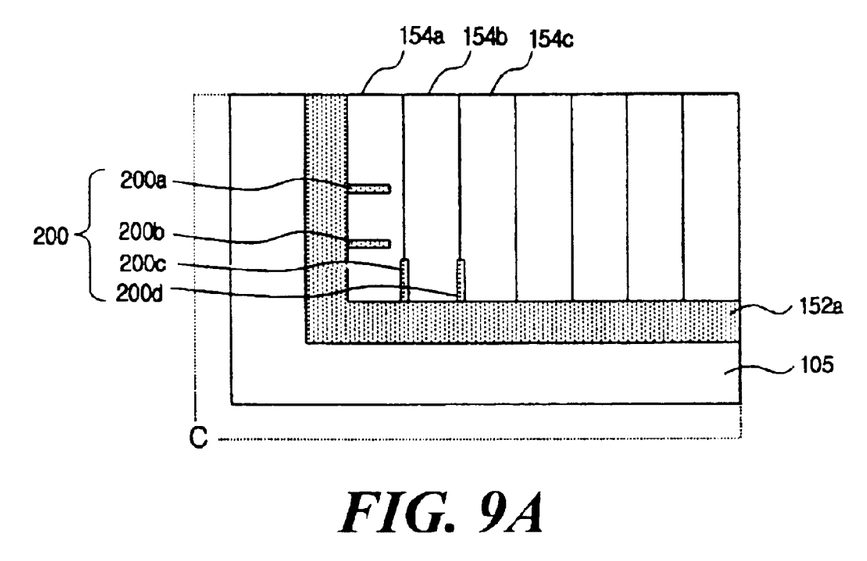
Figure 9B:
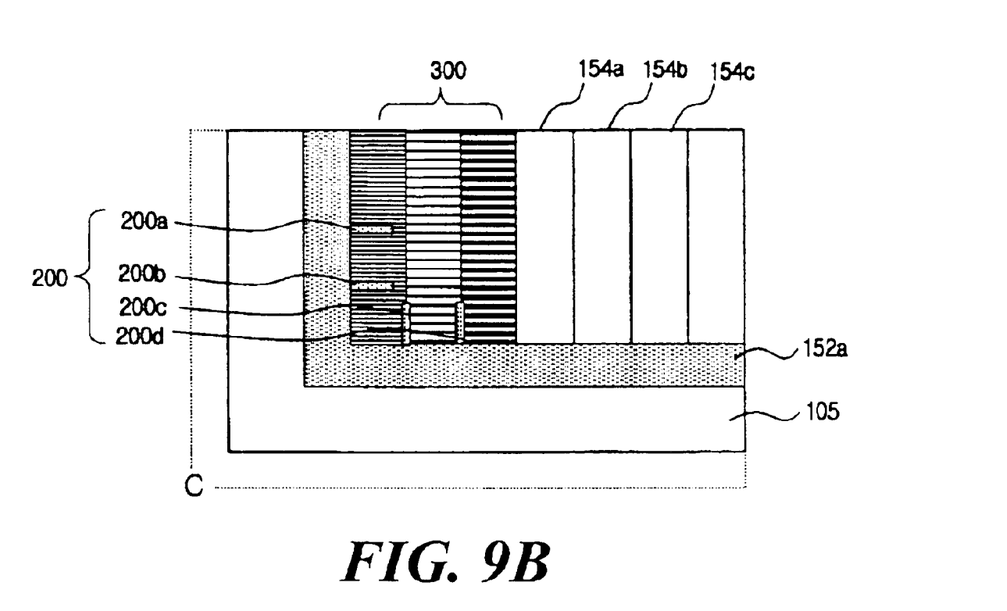
Figure 9C:
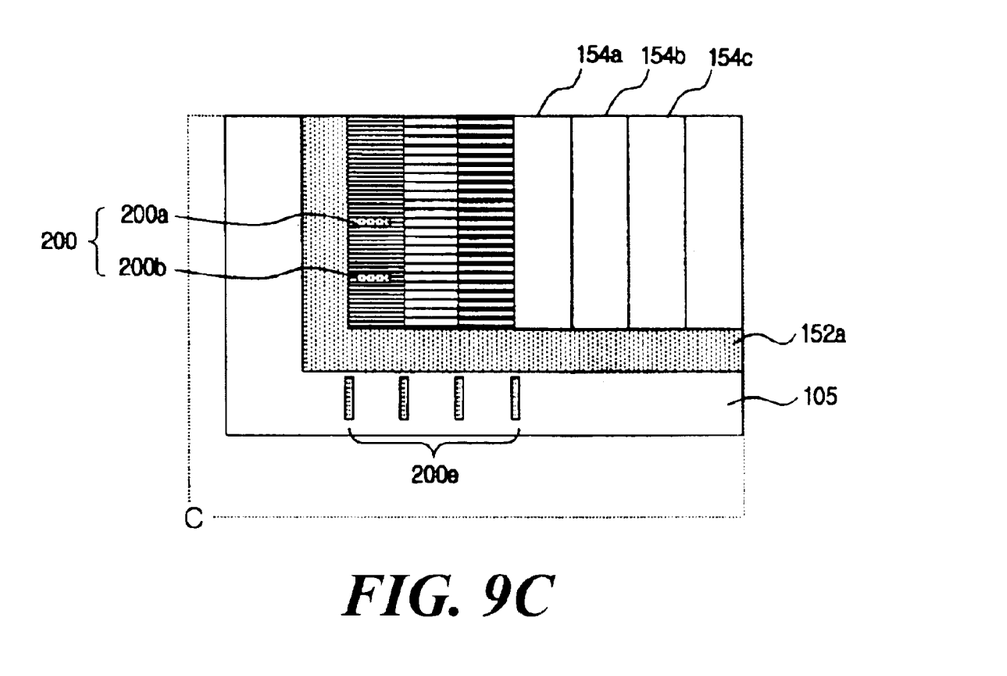

FIGS. 9A to 9C are enlarged plane views of the portion "C" of FIG. 7 illustrating black matrices and alignment marks in accordance with the present invention. Similar to FIGS. 8A to 8C, a light impermeable layer 152a surrounds color filters 154, in FIGS. 9A to 9C. Furthermore, a plurality of internal black matrices is located on the color filters 154. Alternatively, a plurality of the internal black matrices may be formed on the other substrate.

When the black matrices occupy a relatively small area of the transparent substrate 105, the alignment marks 200 are formed to be perpendicular to each other. First and second alignment marks 200a and 200b are perpendicular to a boundary between the color filters 154a and 154b. Further, third and fourth alignment marks 200c and 200d are disposed between the color filters 154a and 154b and between the color filters 154b and 154c, respectively. Therefore, the first and second alignment marks 200a and 200b are perpendicular to the third and fourth alignment marks 200c and 200d. In forming the alignment marks 200, a size of the alignment marks 200 is minimized, so that an aperture ratio of the LCD panel is not decreased. Since the first to fourth alignment marks 200a to 200d are formed with the black matrices 152, they may be formed of the same material as the black matrices 152.

FIG. 9B shows that the dummy patterns 300 are formed on the LCD panel. The dummy patterns 300 are disposed inside the light impermeable layer 152a and have a striped shape like the color filters 154. In forming the dummy patterns 300, the third and fourth alignment marks 200c and 200d are formed between the dummy patterns 300, and the first and second alignment marks 200a and 200b are formed to be perpendicular to the third and fourth alignment marks 200c and 200d.

The alignment marks 200 may be formed inside the light impermeable layer 152a, in FIG. 9B. Also, the alignment marks may be formed outside the light impermeable layer 152a. As shown in FIG. 9C, the alignment marks 200e are formed outside the light impermeable layer 152a in a location corresponding to the dummy patters 300. Each alignment marks 200e corresponds to a boundary between the dummy patterns or between the dummy pattern 300 and the color filter 154a.

When the alignment marks are formed to be perpendicular to each other, the color filters are aligned easily into the desired positions. Especially, when the black matrices occupy a relatively small area of the transparent substrate 105, the color filters should be aligned much more precisely with the perpendicularly formed alignment marks.

According to the present invention, the alignment marks formed with the black matrices prevent a misalignment of the color filters. Moreover, since the alignment marks are formed in the dummy pattern areas or/and outside the light impermeable layer, an aperture ratio of the LCD panel is not degraded.

It will be apparent to those skilled in the art that various modifications and variations can be made in the liquid crystal display panel having a light impermeable layer with alignment marks the present invention without departing from the spirit or scope of the inventions. Thus, it is intended that the present invention covers the modifications and variations of this invention provided they come within the scope of the appended claims and their equivalents.

What is claimed is:

1. A liquid crystal display panel, comprising:
    a light impermeable layer along a peripheral portion of a substrate;
    a first plurality of alignment marks around at least first and second corners of the substrate, the first and second corners being separated from each other in a diagonal direction;
    a plurality of color filter layers, each extending along a first direction within a first region surrounded by the light impermeable layer; and
    a second plurality of alignment marks formed perpendicular to a boundary between the color filter layers,
    wherein the first plurality of alignment marks extend from the light impermeable layer along the first direction.

2. The panel according to claim 1, further comprising a plurality of disconnected island-shaped black matrices on the substrate within the first region.

3. The panel according to claim 2, wherein the first plurality of alignment marks, light impermeable layer, and the black matrices are formed at the same time.

4. The panel according to claim 1, wherein the first plurality of alignment marks are formed of the same material as the light impermeable layer.

5. The panel according to claim 1, wherein at least two of the first plurality of alignment marks are disposed near a corner of the light impermeable layer.

6. The panel according to claim 1, wherein each of the first plurality of alignment marks are disposed between the color filter layers and extend from the light impermeable layer along the first direction.

7. The panel according to claim 6, wherein the first plurality of alignment marks extend from the light impermeable layer to an interior of the first region.

8. The panel according to claim 1, further comprising a third plurality of alignment marks around at least first and second corners of the substrate, the first and second corners being separated from each other in a diagonal direction and extending from the light impermeable layer along a second direction opposite to the first direction at an exterior of the first region.

9. The panel according to claim 8, wherein the first plurality of alignment marks, the second plurality of alignment marks, the light impermeable layer, and the black matrices are formed at the same time.

10. The panel according to claim 1, wherein the first plurality of alignment marks are disposed between adjacent ones of the plurality of color filter layers.

11. The panel according to claim 1, further comprising a plurality of dummy patterns extending along the first direction within the first region.

12. The panel according to claim 11, wherein each of the first plurality of alignment marks are disposed between adjacent ones of the plurality of dummy patterns around a corner of the light impermeable layer.

13. The panel according to claim 12, further comprising a third plurality of alignment marks extending from the light impermeable layer along a second direction perpendicular to the first direction across one of the plurality of dummy patterns.

14. The panel according to claim 13, wherein the first plurality of alignment marks, the second plurality of alignment marks, the light impermeable layer, and the black matrices are formed at the same time.

15. The panel according to claim 12, further comprising a third plurality of alignment marks extending from the light impermeable layer along a second direction perpendicular to a boundary between the plurality of color filter layers and the plurality of dummy patterns.

16. A liquid crystal display device, comprising:
first and second substrates facing each other;
a plurality of thin film transistors on the first substrate;
a light impermeable layer surrounding a first region on the second substrate;
a plurality of disconnected island-shaped black matrices within the first region on the second substrate, the first region aligned with a second region;
a first plurality of alignment marks around at least first and second corners of the second substrate, wherein the first and second corners are separated from each other in a diagonal direction;
a plurality of color filter layers on the second substrate, each extending along a first direction within the first region surrounded by the light impermeable layer; and
a plurality of dummy patterns extending along the first direction within the first region on the second substrate,
wherein the first plurality of alignment marks extend from the light impermeable layer along the first direction to an interior of the first region.

17. The device according to claim 16, further comprising a second plurality of alignment marks around at least the first and second corners of the second substrate and extending from the light impermeable layer along a second direction opposite to the first direction at an exterior of the first region.

18. The device according to claim 16, wherein the first plurality of alignment marks are disposed between adjacent ones of the plurality of color filter layers.

19. The device according to claim 16, wherein each of the first plurality of alignment marks are disposed between adjacent ones of the plurality of dummy patterns.

20. The device according to claim 16, further comprising a second plurality of alignment marks extending from the light impermeable layer along a second direction perpendicular to the first direction across one of the plurality of dummy patterns.

21. A liquid crystal display panel, comprising:
a light impermeable layer along a peripheral portion of a substrate;
a first plurality of alignment marks and a second plurality of alignment marks around at least first and second corners of the substrate, the first and second corners being separated from each other in a diagonal direction;
a plurality of color filter layers, each extending along a first direction within a first region surrounded by the light impermeable layer; and
a plurality of dummy patterns, each extending along the first direction within the first region adjacent to the light permeable layer;
wherein the second plurality of alignment marks extend from the light impermeable layer along a second direction perpendicular to the first direction within the first region to cross one of the plurality of dummy layers, and the first plurality of alignment marks extend along the first direction at an exterior of the first region.

* * * * *